Patented Dec. 21, 1948

2,456,688

UNITED STATES PATENT OFFICE 2,456,688

CELLULOSE ESTER STABILIZATION IN ANHYDROUS MEDIUM

Camille Dreyfus, New York, N. Y., and Robert D. Rowley and Robert F. Thompson, Narrows, Va., assignors to Celanese Corporation of America, a corporation of Delaware No Drawing. Application October 9, 1945, Serial No. 621,380

7 Claims. (Cl. 260—230)

This invention relates to the production of fully esterified organic acid esters of cellulose and relates more particularly to the production of stable cellulose tri-acetate of improved physical characteristics.

An object of this invention is the preparation of fully esterified organic acid esters of cellulose of improved stability.

Another object of this invention is the production of highly stable fully esterified cellulose acetate by an improved stabilization procedure.

Other objects of our invention will appear from the following detailed description.

In the process of preparing organic acid esters of cellulose, such as cellulose acetate, for example, the esterification reaction is usually carried out by treating cellulose with an organic acid anhydride in the presence of a catalyst such as sulfuric acid and an organic acid diluent, or solvent, for the cellulose ester being formed. The fully esterified cellulose tri-ester produced is obtained in the form of a viscous, homogeneous solution in the organic acid diluent employed. Water is then added to this primary cellulose ester solution in an amount sufficient to convert any organic acid anhydride remaining to the corresponding acid. The fully esterified primary cellulose ester, usually after the addition of a further quantity of water to the viscous solution obtained, is permitted to hydrolyze or ripen in solution from the primary cellulose tri-ester to a secondary cellulose ester of a lower degree of esterification having the desired solubility characteristics. During ripening not only are acyl groups split off but, in addition, combined sulfuric acid is removed. Water and/or other non-solvent for the cellulose ester is then added in sufficient amounts to precipitate the hydrolyzed cellulose ester from solution. The precipitated secondary cellulose ester is washed with water to remove as much acid and other non-cellulose ester materials, including sulfur compounds, as possible and is then subjected to a stabilizing treatment with the object of still further reducing its content of combined sulfuric acid. Any combined sulfuric acid imparts to the cellulose ester a tendency to decompose, degrade and/or discolor. The degree of stability is measured by the degree of acidity developed when a sample of the cellulose ester is treated with distilled water at elevated temperature and pressure for a predetermined period of time. The development of excess acidity denotes a product of unsatisfactory stability.

Fully esterified or unhydrolyzed cellulose esters, such as cellulose tri-acetate, for example, do not usually possess a satisfactory degree of stability. However, the treatments heretofore employed for stabilizing secondary, or hydrolyzed, cellulose esters are not suitable for use with fully esterified or unhydrolyzed cellulose esters. This is probably due to the fact that since the cellulose tri-acetates have not been hydrolyzed, little or none of the combined sulfuric acid has been split off. Furthermore, stabilization of these fully esterified cellulose esters does not have the desired effect since on precipitation from the esterifying medium the fully esterified cellulose esters normally precipitate in a hard and horny form instead of as a loose, open fiber. The hard and horny precipitated cellulose esters are not only difficult to wash but, in addition, strongly resist penetration by liquids, making any attempt at stabilization quite ineffective. Since the combined sulfuric acid cannot be removed, such fully esterified cellulose esters are not very stable and undergo rapid discoloration, degradation or decomposition, particularly when exposed to elevated temperatures, as during molding operations.

We have now found that the stability of fully esterified organic acid esters of cellulose may be substantially improved by subjecting the primary solution of fully esterified cellulose, which is obtained at the completion of esterification reaction, to an improved stabilization treatment without precipitating the cellulose ester from solution. In accordance with the novel process of our invention, the desired stabilization of the fully esterified cellulose ester in the primary solution is effected by first neutralizing all of the esterification catalyst, i. e. sulfuric acid, present in the esterification medium at the completion of esterification and then heating the neutralized primary solution to an elevated temperature of 85° C. to 130° C. for 30 to 1 hours. Only the esterification catalyst is neutralized, our novel stabilization process being effected without removing any of the acid anhydride still present and without converting it to the corresponding acid. On precipitation of the cellulose tri-ester from the primary solution by the addition of an excess of water thereto, following this novel stabilization treatment, the cellulose tri-ester precipitates in the form of a soft, white fiber which may be easily washed free of acid and then dried. The cellulose tri-ester obtained by our novel process possesses a high order of stability and, due to the fact that the combined sulfuric acid is substantially reduced, may be molded at elevated temperatures without any discoloration or decomposition.

Example II

A primary solution of cellulose tri-acetate, obacetylated with acetic anhydride employing sulfuric acid as catalyst and acetic acid as the solvent, the step which comprises neutralizing substantially all of the sulfuric acid catalyst in the primary cellulose acetate solution obtained on completion of esterification by adding magnesium acetate thereto, and then heating the neutralized primary solution containing aliphatic acid anhydride to a temperature of 85° C. to 130° C. for 30 to 1 hours, whereby the stability of the cellulose tri-acetate is improved.

6. In a process for the production of highly stable cellulose tri-acetate wherein cellulose is acetylated with acetic anhydride employing sulfuric acid as catalyst and acetic acid as the solvent, the step which comprises neutralizing substantially all of the sulfuric acid catalyst in the primary cellulose acetate solution obtained on completion of esterification by adding magnesium acetate thereto, and then heating the neutralized primary solution containing aliphatic acid anhydride to a temperature of about 90° C. for about 24 hours.

7. In a process for the production of highly stable cellulose tri-acetate wherein cellulose is acetylated with acetic anhydride employing sulfuric acid as catalyst and acetic acid as the solvent, the step which comprises neutralizing substantially all of the sulfuric acid catalyst in the primary cellulose acetate solution obtained on completion of esterification by adding magnesium acetate thereto, and then heating the neutralized primary solution containing aliphatic acid anhydride to a temperature of about 120° C. for about 3.5 hours.

CAMILLE DREYFUS.
ROBERT D. ROWLEY.
ROBERT F. THOMPSON.

REFERENCES CITED

The following references are of record in the file of this patent:

UNITED STATES PATENTS

| Number | Name | Date |
|---|---|---|
| 2,203,749 | Seymour et al. | June 11, 1940 |
| 2,343,669 | Hincke et al. | Mar. 7, 1944 |

FOREIGN PATENTS

| Number | Country | Date |
|---|---|---|
| 313,198 | Great Britain | June 7, 1929 |